US008495060B1

(12) United States Patent
Chang (10) Patent No.: US 8,495,060 B1
(45) Date of Patent: Jul. 23, 2013

(54) PRIORITIZATION OF REPORTS USING CONTENT DATA CHANGE FROM BASELINE

(75) Inventor: Hung-Jen Chang, Fremont, CA (US)

(73) Assignee: Trend Micro, Inc., Tokyo (JP)

( * ) Notice: Subject to any disclaimer, the term of this patent is extended or adjusted under 35 U.S.C. 154(b) by 55 days.

(21) Appl. No.: 12/961,904

(22) Filed: Dec. 7, 2010

(51) Int. Cl.
*G06F 17/30* (2006.01)

(52) U.S. Cl.
USPC ............................................. 707/723; 726/23

(58) Field of Classification Search
USPC .... 707/740, 104, 743, 723, 792, 722; 706/12, 706/14
See application file for complete search history.

(56) References Cited

U.S. PATENT DOCUMENTS

| 6,530,873 | B1* | 3/2003 | Lee ..................................... 600/1 |
| 6,674,908 | B1* | 1/2004 | Aronov .......................... 382/232 |
| 7,418,120 | B2* | 8/2008 | Weiner et al. .................. 382/128 |
| 8,024,327 | B2* | 9/2011 | Tunkelang et al. ............ 707/722 |
| 8,069,484 | B2* | 11/2011 | McMillan et al. ............... 726/23 |
| 2004/0102926 | A1* | 5/2004 | Adendorff et al. ............. 702/182 |
| 2007/0027636 | A1* | 2/2007 | Rabinowitz ..................... 702/20 |
| 2008/0270363 | A1* | 10/2008 | Hunt et al. ......................... 707/3 |
| 2009/0106178 | A1* | 4/2009 | Chu ................................ 706/14 |
| 2009/0119330 | A1* | 5/2009 | Sampath et al. .............. 707/102 |
| 2009/0259550 | A1* | 10/2009 | Mihelich et al. ........... 705/14.42 |
| 2009/0299769 | A1* | 12/2009 | Dam et al. .......................... 705/3 |
| 2010/0036884 | A1* | 2/2010 | Brown ........................ 707/104.1 |
| 2010/0082691 | A1* | 4/2010 | Jaster et al. .................... 707/792 |
| 2010/0299323 | A1* | 11/2010 | Crook ........................... 707/723 |
| 2011/0035379 | A1* | 2/2011 | Chen et al. ..................... 707/740 |
| 2011/0055220 | A1* | 3/2011 | Tyburski ....................... 707/743 |
| 2011/0103657 | A1* | 5/2011 | Kang et al. ..................... 382/128 |
| 2011/0112747 | A1* | 5/2011 | Downs et al. ................. 701/118 |
| 2011/0119212 | A1* | 5/2011 | De Bruin et al. ............... 706/12 |
| 2011/0258182 | A1* | 10/2011 | Singh et al. .................... 707/723 |

* cited by examiner

*Primary Examiner* — James Trujillo
*Assistant Examiner* — Thong Vu
(74) *Attorney, Agent, or Firm* — Beyer Law Group LLP (57) ABSTRACT

The raw data for a plurality of numerical reports (distributions or histograms) concerning malware infection in a computer network are stored in a data source. The data source is queried to produce any number of reports. Each report's content comes from a distribution of data within a time interval, and a baseline distribution is formed for comparison by the corresponding historical data. The shape change for the distributions is determined by using Kullback-Leibler divergence. The change of volume (i.e., total sample count) for the distributions is determined using the $L^1$ norm ratio. A cutoff threshold is determined for the K-L divergence and the volume ratio threshold is determined for the count change. A measure value for each report is determined by multiplying the shape change by the volume change (modified by raising it to a particular power). The reports are ranked based upon their measure values. A report is determined to be important if its shape change is greater than the cutoff threshold, if it's volume change is greater than the count ratio threshold, or if the measure value is greater than a measure threshold. The invention can be applied to all kinds of reports suitable for a distribution or histogram, and also provides one approach to detect anomalous behaviors.

28 Claims, 6 Drawing Sheets

| Bin: time | Current Count | Baseline Count |
|---|---|---|
| 2009-11-14T00:00:00Z | 620 | 515 |
| 2009-11-14T01:00:00Z | 317 | 428 |
| 2009-11-14T02:00:00Z | 597 | 1919 |
| 2009-11-14T03:00:00Z | 310 | 754 |
| 2009-11-14T04:00:00Z | 362 | 492 |
| 2009-11-14T05:00:00Z | 323 | 361 |
| 2009-11-14T06:00:00Z | 367 | 395 |
| 2009-11-14T07:00:00Z | 489 | 837 |
| 2009-11-14T08:00:00Z | 820 | 5170 |
| 2009-11-14T09:00:00Z | 1330 | 4638 |
| 2009-11-14T10:00:00Z | 1267 | 4618 |
| 2009-11-14T11:00:00Z | 1219 | 6029 |
| 2009-11-14T12:00:00Z | 1593 | 12319 |
| 2009-11-14T13:00:00Z | 1182 | 6557 |
| 2009-11-14T14:00:00Z | 1317 | 4818 |
| 2009-11-14T15:00:00Z | 1147 | 5540 |
| 2009-11-14T16:00:00Z | 1118 | 5333 |
| 2009-11-14T17:00:00Z | 566 | 2734 |
| 2009-11-14T18:00:00Z | 459 | 997 |
| 2009-11-14T19:00:00Z | 437 | 534 |
| 2009-11-14T20:00:00Z | 488 | 452 |
| 2009-11-14T21:00:00Z | 664 | 307 |
| 2009-11-14T22:00:00Z | 449 | 411 |
| 2009-11-14T23:00:00Z | 313 | 373 |

204  208  212

Total Event Counts by Hour:
Report Index 0

| Bin: time | Current Count | Baseline Count |
|---|---|---|
| 2009-11-14T00:00:00Z | 620 | 515 |
| 2009-11-14T01:00:00Z | 317 | 428 |
| 2009-11-14T02:00:00Z | 597 | 1919 |
| 2009-11-14T03:00:00Z | 310 | 754 |
| 2009-11-14T04:00:00Z | 362 | 492 |
| 2009-11-14T05:00:00Z | 323 | 361 |
| 2009-11-14T06:00:00Z | 367 | 395 |
| 2009-11-14T07:00:00Z | 489 | 837 |
| 2009-11-14T08:00:00Z | 820 | 5170 |
| 2009-11-14T09:00:00Z | 1330 | 4638 |
| 2009-11-14T10:00:00Z | 1267 | 4618 |
| 2009-11-14T11:00:00Z | 1219 | 6029 |
| 2009-11-14T12:00:00Z | 1593 | 12319 |
| 2009-11-14T13:00:00Z | 1182 | 6557 |
| 2009-11-14T14:00:00Z | 1317 | 4818 |
| 2009-11-14T15:00:00Z | 1147 | 5540 |
| 2009-11-14T16:00:00Z | 1118 | 5333 |
| 2009-11-14T17:00:00Z | 566 | 2734 |
| 2009-11-14T18:00:00Z | 459 | 997 |
| 2009-11-14T19:00:00Z | 437 | 534 |
| 2009-11-14T20:00:00Z | 488 | 452 |
| 2009-11-14T21:00:00Z | 664 | 307 |
| 2009-11-14T22:00:00Z | 449 | 411 |
| 2009-11-14T23:00:00Z | 313 | 373 |

Total Event Counts by Hour:
Report Index 0

FIG. 4

| Bin: Name | Current Count | Top 10? | Baseline Count | Top 10? |
|---|---|---|---|---|
| WORM_DOWNAD.AD | 5356 | true | 10912 | true |
| TROJ_GENERIC.APC | 3340 | true | 13723 | true |
| Mal_DownadJ | 2118 | true | 2857 | true |
| WORM_DOWNAD | 1927 | true | 3219 | true |
| RTL_GENCLEAN.001 | 841 | true | 1702 | false |
| Possible_Mlwr-13 | 372 | true | 0 | false |
| TROJ_DOWNADJOB.A | 349 | true | 643 | false |
| WORM_SILLY.PD | 343 | true | 1053 | false |
| TROJ_Generic | 280 | true | 804 | false |
| POSSIBLE_AUTORUN | 222 | true | 1343 | true |
| PE_HUNK.CAR | 125 | false | 1892 | true |
| Mal_Hifrm | 25 | false | 1490 | true |
| BAT_AGENT.ASBZ | 16 | false | 1412 | true |
| HTML_HIFRM.A-CN | 0 | false | 1332 | true |

Top Infecting Malware Names by Hour:
Report Index 3

*FIG. 5* priority = 1 ~ 321
rpt idx = 6 ~ 322
zero bl bin num = 5 ~ 323
BCZ Percent = 0.14 ~ 324
Sum Ratio = 0.30217391304347824 ~ 325
Standard Sample Num = 3000 ~ 326
Sample Ratio Power = 0.1 ~ 327
K-L divergence = 0.5385357737541199 ~ 328

304 priority = 2
rpt idx = 2
zero bl bin num = 4
BCZ Percent = 0.14
Sum Ratio = 0.24500665778961384
Standard Sample Num = 3000
Sample Ratio Power = 0.1
K-L divergence = 0.641294002532959

308 priority = 3
rpt idx = 1
zero bl bin num = 2
BCZ Percent = 0.14
Sum Ratio = 0.400036886757654
Standard Sample Num = 3000
Sample Ratio Power = 0.1
K-L divergence = 0.16109749674797058

312

Report Ranking

PRIORITIZATION OF REPORTS USING CONTENT DATA CHANGE FROM BASELINE

FIELD OF THE INVENTION

The present invention relates generally to the analysis of large volumes of data. More specifically, the present invention relates to filtering and prioritizing reports based upon content change from a baseline.

BACKGROUND OF THE INVENTION

Analyzing a very large volume of data is often critical to resolving a particular problem. "Too many reports to study" is an often heard comment from business analysts who do not have the time to read the many reports available regarding a particular issue. The current state of computer technology, the number of software products, and ease of their use have generally made the generation of a great number of reports relatively easy.

One prior approach that has been used involves correlation of a predefined report set. If a user reads a particular subset of reports together, then these reports may be correlated into the same neighborhood. Therefore, when another user picks out one of these reports for reading, a recommendation engine recommends the other reports that had been previously correlated together. Unfortunately, this technique requires starting with a predefined report set with a qualitative correlation rule, and it needs a certain time period for building up the neighborhoods. Also, this technique cannot provide objective evidences on why a particular report is important and cannot prioritize the importance of the various reports. In general, there is no standard, quantitative analysis technique that can be used to analyze dynamically changing reports and produce a result that can be repeated.

In the field of mathematics, probabilities, statistics and information theory are known. For example, conditional probabilities are useful in the analysis of observations. Suppose that the sample space of n independent observations, $\square$, is partitioned into the disjoint sets $S_1$ and $S_2$, such that $S_1 \cap S_2 = 0$ and $S_1 \cup S_2 = \square$. If the sample point $x \in S/$, hypothesis $H_1$ is accepted and $H_2$ is rejected. If the sample point $x \in S_2$, hypothesis $H_2$ is accepted and $H_1$ is rejected. The probabilities can be defined as follows.

$\alpha = \text{Prob}(x \in S_1 | H_2) = p2(S_1)$: The probability of incorrectly accepting hypothesis $H_1$.

$1 - \alpha = \text{Prob}(x \in S_2 | H_2) = p2(S_2)$: The probability of correctly accepting hypothesis $H_2$.

$\beta = \text{Prob}(x \in S_2 | H_1) = p1(S_2)$: The probability of incorrectly accepting hypothesis $H_2$.

$1 - \beta = \text{Prob}(x \in S_1 | = H_1) = p1(S_1)$: The probability of correctly accepting hypothesis $H_1$.

Then, if we let $S_1$ be the positive set and $S_2$ be the negative set, $\alpha$ is false positive probability and $\beta$ is false negative probability.

The Kullback-Leibler divergence uses the following parameters.

n: number of bins.

$f_{1i}$: the probability of seeing a giving sample in bin i of distribution 1. Note that $f_{1i} \geq 0$ and $\Sigma^n_{i=1} f_{1i} = 1$.

$f_{2i}$: the probability of seeing a giving sample in the corresponding bin i of distribution 2. Note that $f_{2i} \geq 0$ and $\Sigma^n_{i=1} f_{2i} = 1$.

Self-Entropy for $f_k$: $-\Sigma f_{ki} \ln(f_{ki})$, where $k \in (1, 2)$.

Cross-Entropy in favor of $f_1$ against $f_2$: $-\Sigma f_{1i} \ln(f_2 i)$.

Relative-Entropy (Kullback-Leibler divergence) in favor of $f_1$ against $f_2$: $E_r(f_1, f_2) = \Sigma f_{1i} \ln(f_{1i}/f_{2i})$.

Cross-Entropy is, theoretically, always greater than or equal to Self-Entropy. Their difference is defined as Relative-Entropy (Cross-Entropy–Self-Entropy). Relative-Entropy is the information for discrimination. Statistically, it is the expectation of the logarithmic difference between the probabilities $f_1$ and $f_2$. (The expectation is taken based on the probabilities $f_1$. This is what "in favor of $f_1$ against $f_2$" meant.) The Kullback-Leibler divergence is only defined if ($f_{2i} > 0$ and $f_{1i} \geq 0$) or ($f_{2i} = 0$ and $f_{1i} = 0$). Note that $f_{1i} \ln(f_{1i}/f_{2i})$ approaches 0 when both $f_{1i}$ and $f_{2i}$ approach to 0.

The $L^1$ norm of a vector is useful in representing the total sample count of a distribution. Given a vector $x = (x_1, x_2, \ldots, x_n)^T$ with size n, an $L^1$ norm of x is defined as $|x| = \Sigma^n_{i=1} |x_i|$. Let each element of a vector x represents the corresponding histogram count of a distribution f. The volume of the distribution (i.e., the total count of samples) is defined by an $L^1$ norm, $|x|$. Let $x_1$ and $x_2$ represent two histogram counts of two distributions, then the volume ratio for $f_1$ against $f_2$ is defined as $|x_1|/|x_2|$.

Even though many mathematical techniques are known, none have been applied successfully to the problem of too many reports and how to filter and prioritize them. It would be desirable to develop a technique to automatically ignore unimportant reports while at the same time prioritizing the truly important reports that should be read.

SUMMARY OF THE INVENTION

To achieve the foregoing, and in accordance with the purpose of the present invention, a technique is disclosed for filtering out unimportant reports and for prioritizing the remaining important reports in order to handle a large volume of reports. An unimportant report can mean that the report's content data is statistically not far away from its baseline data.

Unlike the prior art, the present invention provides a quantitative analysis technique whose results are repeatable based upon the objective evidences. In other words, a procedure is defined that produces the same result for given set of reports when repeated. The output produces a prioritization of reports that are input. Also provided is a technique for prioritizing reports and filtering out reports that are not important using report-dependent thresholds. Although the Kullback-Leibler (i.e., K-L) divergence is known, it has not been used before in the analysis of report data nor combined with an analysis of change of sample counts or the use of dynamic thresholds. Here, a "report-dependent" or "dynamic" threshold means the threshold is a function of total bin number and average sample count of a given distribution.

In one embodiment, the present invention uses the K-L divergence to determine a shape change value and $L^1$ norm ratio to determine a volume change value based upon a current report distribution against a corresponding baseline distribution. The combination of these values may be used to rank a list of input reports and one or both values may then be used to determine which reports are important and which are unimportant.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention uses input report data in the form of distributions or histograms to make conclusions about the importance of a current report. For example, a report may list the number of malware events in a computer network that occur each hour. If this report were to be presented in graphical form, the x-axis of the report is time (the 24 hours in the day) while the y-axis is the number of malware events that occur during one of those hours, thus producing a current report histogram. Historical report data for the number of malware events may be used to form a baseline histogram, but instead of listing malware events for the current day, the y-axis data could be from the mean value of each corresponding weekly-hour within a moving time period such as an eight-week duration, etc. Here, "current" means when the events in the report content were logged; the "historical" is relative to the "current." Each histogram has a particular shape to its curve and a particular area beneath its curve. It is therefore realized that K-L divergence measures the shape change between such a current histogram and a baseline histogram and that the volume change between the two histograms may also be measured. (The singularity issue for K-L divergence calculation is also handled practically.) Advantageously, a measurement of the combination of these two values coupled with a comparison of these values to the corresponding thresholds leads to filtering, ranking and prioritization of a large volume of reports that must be analyzed.

As known in the art, a histogram includes bins plotted along the x-axis and the value for a bin being plotted along the y-axis. For example, a report on the number of malware events per hour plots time along the x-axis were each bin is an individual hour of the day; the y-axis plots the number of events during that hour. In another example, a report on the top infecting malware names by hour plots each malware name along the x-axis were each bin is the name of malware; the y-axis plots the number of infections caused by that particular malware per hour. For the computer virus related reports, bins may be discrete units such as hours, names of malware, infected hosts, infected users, infected files, etc.

Application of Kullback-Leibler Divergence to Distributions

Considering conditional probabilities, the Kullback-Leibler divergence, the Kullback Theorem and other techniques, the inventor has realized that these techniques may be used (with modification) along with other improvements in order to analyze a volume of reports. Specifically, the content data of one report (a first distribution) may be compared to the baseline data of that report (a second distribution) to reach a conclusion about the importance of that report and to prioritize it.

Specifically, it is recognized that the four probabilities parameters mentioned above, $\alpha$, $1-\alpha$, $\beta$ and $1-\beta$, may be used to provide a cut-off threshold for Kullback-Leibler divergence. In addition, considering the Kullback-Leibler divergence, since $E_r(f_1, f_2) \neq E_r(f_2, f_1)$, Relative-Entropy is not a true metric. It does, however, satisfy important mathematical properties: (1) it is a convex function of $f_{1i}$, (2) it is always nonnegative, and (3) it equals to zero if and only if $f_{1i}=f_{2i}$. Therefore, Relative-Entropy may be used as a measure of change in a distribution.

It is further recognized that the Kullback Theorem can apply to tell if two distributions are sufficiently different. Assume x is used for the generic variable. Formally, let $H_1$ be the hypothesis that x is from the statistical population with probability distribution $f_1$, and $H_2$ be the hypothesis that x is from the statistical population with probability distribution $f_2$. Considering the conditional probabilities mentioned above, we can assign a type I error (false positives) probability=$\alpha$ and a type II error (false negatives) probability=$\beta$, respectively. Kullback's Theorem 3.1 in Information Theory and Statistics states that, $$E(N/f_1)\Sigma f_{1i} \ln(f_{1i}/f_{2i}) \geq \beta \ln(\beta/(1-\alpha))+(1-\beta)\ln((1-\beta)/\alpha)$$

and $$E(N/f_2)\Sigma f^{2i} \ln(f_{2i}/f_{1i}) \geq \alpha \ln(\alpha/(1-\beta))+(1-\alpha)\ln((1-\alpha)/\beta),$$

where

N denotes a sample size. $E(N/f_1)$ is the expected sample size given the distribution $f_1$ is correct, and $E(N/f_2)$ is the expected sample size given the distribution $f_2$ is correct.

One may conclude that two distributions $f_1$ and $f_2$ are close if the number of samples that are required to distinguish between the two is large. In other words, the content data distribution of a report is similar to the baseline data distribution for that report if a large number of samples are required to distinguish the two. On the other hand, if the number required is small, the two distributions are very different. In other words, the content data distribution of a report is quite different from the baseline data distribution for that report if only a small number of samples are required to distinguish the two. From a viewpoint of report analysis and comparison, only the cases where $f_1$ and $f_2$ are far apart are interesting, that is, if the expected number of samples required to distinguish them is not large.

We assume the expected sample size given a distribution is correct, is proportional to the number of bins, which is on the order of $10^1$ rather than $10^2$ or $10^3$. For example, consider a report is for the number of malware events that occur each hour in the past day. Let both $E(N/f_1)$ and $E(N/f_2)$ being $14 \approx 24 \times 0.59$, and $\alpha=10^{-2}$, $\beta=10^{-3}$, we therefore have $$\Sigma f_{1i} \ln(f_{1i}/f_{2i}) > 0.328 \text{ and } \Sigma f_{2i} \ln(f_{2i}/f_{1i}) > 0.484.$$

Thus, it is realized that using the value in the range between about 0.3 and about 0.5 as the cut-off threshold for the Kullback-Leibler divergence is decent when deciding if one distribution is sufficiently different from a second distribution with total bin number=24. Notice that the threshold is report-dependent and thus dynamic.

Prioritization Engine and Overview of Technique

It is further realized that any report including data, such as an antivirus report generated by an antivirus service provider, may be considered a distribution. For example, the data used to present a bar chart, pie chart, line chart, etc., actually forms a distribution. Any report describing, e.g., event counts by time period, the top infected hosts within a time period, the top infected users within a time period, the top malwares within a time period, the top infected files within a time period, the top uncleanable files within a time period, the top infecting hosts within a time period, or the top victim hosts within a time period, is a report having a particular distribution of data. This particular distribution of data forms a first distribution, and a second distribution for comparison may be formed by looking at the baseline data for that type of report, or rather, the historical data for that type of report.

A prioritization engine software module may be used to analyze these distributions, determine which reports are important, and to prioritize the important reports. The prioritization engine queries a database to get the current report data of a given report and the historical data for baseline. It then quantitatively analyzes the shape and the counts of the two distributions, i.e., the first distribution corresponding to the current data and the second distribution corresponding to the baseline data. A high-level description of this analysis and determination of thresholds now follows.

Lab $f_1$ denote the first distribution based on the content data of a current report, and let $f_2$ denote the second distribution based on the content data of the corresponding baseline report (from the historical data). $E_r$=Kullback-Leibler divergence is responsible for measuring the shape change between the distributions and $R_1 = L^1$ norm ratio is responsible for measuring the total sample count change between the distributions. The above two shape change and count change measurements are in favor of "current" against "baseline," which means $E_r(f_1, f_2) = \Sigma f_{1i} \ln(f_1/f_2)$ and $R_1(x_1, x_2) = |x_1|/|x_2|$.

The Kullback equation is then used to dynamically determine the cut-off threshold=$Thr_e$ for Kullback-Leibler divergence. The volume ratio threshold=$Thr_v$ is also dynamically determined. (Please see section, Setting of Thresholds, below for details.)

Based on the combination of Kullback-Leibler divergence and the $L^1$ norm ratio, a measure function, $M = E_r \cdot (R_1)^p$ is defined. (Here, p is an adjustable parameter, which is a positive real number and is used to balance the contributions of $E_r$ and $R_1$ to M. For example, if p=0.5, $M = E_r(R_1)^{0.5}$.)

After all the reports are tested against the measure function, a list of measure values are calculated. By sorting the values, the corresponding importance of reports are ranked. Then, by following the descending order, if, for each report either $E_r > Thr_e$ or $R_1 > Thr_v$, then the content of the current report has deviated from its baseline content. The report is thus recommended and worth taking a look. All of the reports are run through. Those which do not cross either of the thresholds are considered not important. For the important reports that deviate, evidence of importance is available based on the change in content. Here, the evidence includes the ratio of two total distribution sample counts, the Kullback-Leibler divergence between two distributions, the number of bins which have a zero count for baseline data and a non-zero count for current report data, and the corresponding threshold values.

Applicability of Kullback-Leibler Divergence

Since $E_r(f_1, f_2) \neq E_r(f_2, f_1)$, the Kullback-Leibler divergence is not symmetric. If, for example, the data currently seen in bin i has been rarely seen in the past, then $f_{1i}$ would be large or relatively large, and $f_{2i}$ would be small or close to zero. This makes the product $f_{1i} \ln(f_{1i}/f_{2i})$ a very large number and therefore significantly increasing the value of Relative-Entropy, $\Sigma f_{1i} \ln(f_{1i}/f_{2i})$. If, on the other hand, the baseline data usually seen in the past in bin i is rarely seen in bin i currently, then $f_{1i}$ would be small or close to zero, and $f_{2i}$ would be large or relatively large. This makes the product $f_{1i} \ln(f_{1i}/f_{2i})$ a negative number and therefore decreases the value of Relative-Entropy, $\Sigma f_{1i} \ln(f_{1i}/f_{2i})$. This nicely addresses the requirements of the problem to be solved. For example, if the current attack count is reduced when comparing it with historical data we would not treat the case as an anomaly and this bin data should not positively contribute to the measure function. In another example, if the distribution $f_{2i}$ has not changed from $f_{1i}$, then the product $f_{1i} \ln(f_{1i}/f_{2i})$ is zero and there is no value change to Relative-Entropy.

Setting of Thresholds

Assume that there are two distributions $f_1$ and $f_2$. The false positive probability for determining the distribution $f_1$ (i.e., saying the distribution is $f_1$ but actually it is not $f_1$) is $\alpha = 10^{-2}$. The false negative probability for determining the distribution $f_1$ (i.e., saying the distribution is not $f_1$ but actually it is $f_1$) is $\beta = 10^{-3}$. Given the distribution $f_1$ is correct, let the expected sample size, $E(N/f_1) = 14 \approx 24 \times 0.59$, which is here assumed to be proportional to the number of bins or the total number of samples. Then, according to Kullback Theorem $$[\beta \ln(\beta/(1-\alpha)) + (1-\beta)\ln((1-\beta)/\alpha)]/E(N/f_1) = 0.328.$$

If we let the false positive probability, $\alpha = 10^{-3}$ and the false negative probability, $\beta = 10^{-2}$, then $$[\beta \ln(\beta/(1-\alpha)) + (1-\beta)\ln((1-\beta)/\alpha)]/E(N/f_1) = 0.484.$$

We can thus choose the $E_r$ threshold=$Thr_e$=(0.328+0.484)/2.0=0.406. As one can see, if the values of $\alpha$ and/or $\beta$ and/or $E(N/f_1)$ are high, the threshold to ensure a difference is low. In other words, when the number of samples that are required to distinguish the two distributions is large and/or the false rates are high, it is more difficult to tell the difference between the two distributions. Here, by way of the Kullback equations above, we correlate the threshold to false distinguishing rates and number of samples that are required to distinguish.

The volume ratio threshold=$Thr_v$ is a function of b=average sample count per bin of baseline distribution data. Let $Thr_v = 1.0 + (3000/b)^{0.1}$. For example, when b=3000, $Thr_v$=2.0. That means when the total count of the current report is more than twice as many as the baseline data the report is noteworthy reading. Here, we assume that the larger the average baseline sample count per bin is, the smaller the volume ratio threshold should be. Configurable values other than 3000 and 0.1 can be used.

Block Diagram

Figure 1:
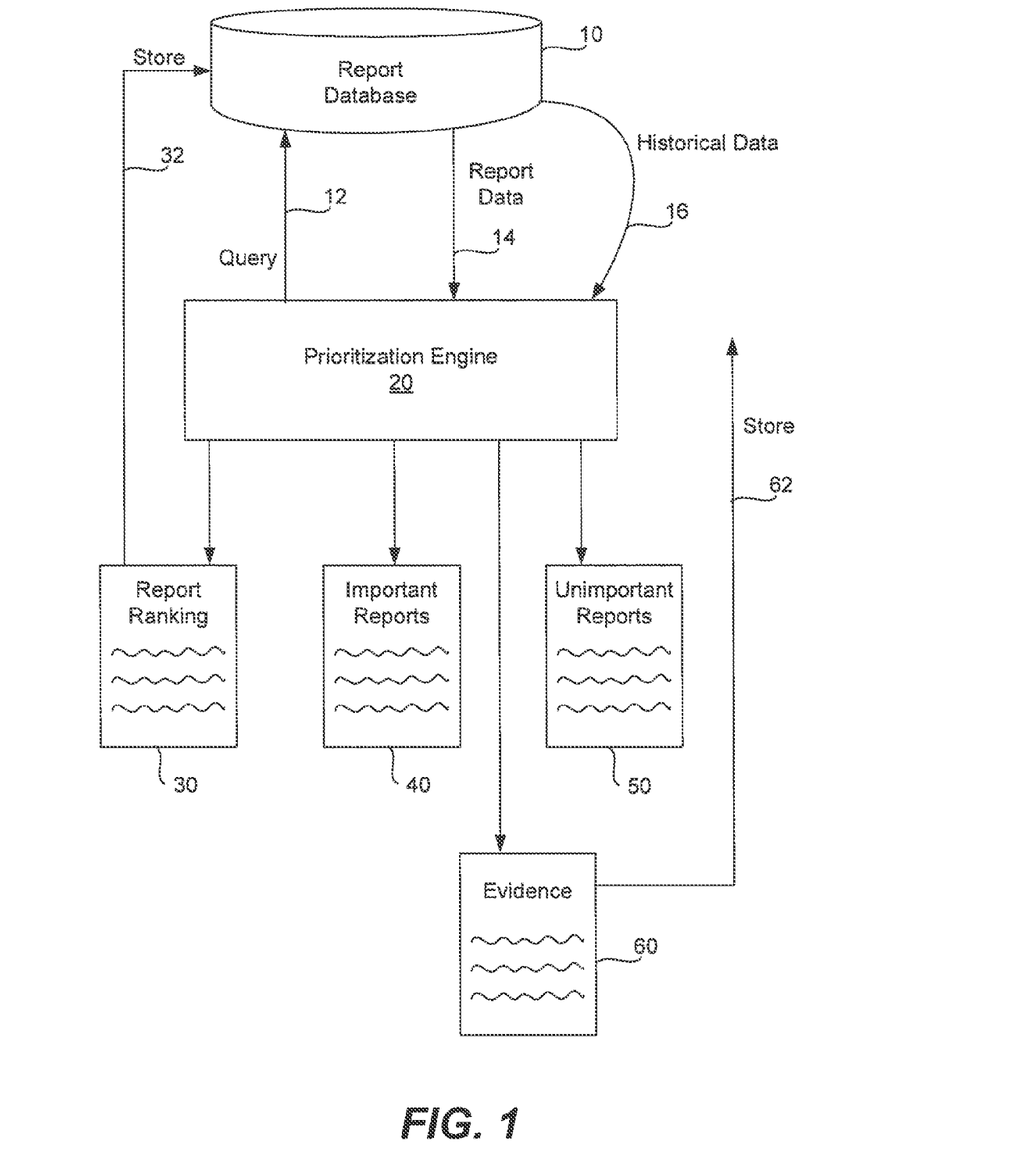
FIG. 1 illustrates an exemplary system for implementing the present invention.

FIG. 1 illustrates an exemplary system for implementing the present invention. A prioritization engine 20 is a software module that executes on any suitable computer such as Windows 7 Enterprise PC with CPU 2.53 GH and Memory 2G, etc., and may be written in a programming language such as Java or C/C++.

The engine 20 sends any number of sets of query statements 12 to a report database 10 and in return receives the same number of current report data 14 as well as historical data 16 for baselining. Each current report data forms the first distribution. The corresponding historical data for baselining forms a second distribution for comparison with the first distribution. The engine 20 is arranged to execute the flow diagram described herein and to provide outputs concerning its conclusions.

Report database 10 may be any suitable data source implemented on a suitable computer. In one embodiment, database 10 is a Solr database implemented by the antivirus service provider Trend Micro, Inc. Other examples of data sources include an entity-relational database, a spreadsheet file such as Excel, or a flat file, etc. Data of event logs are stored in a data source. Dependent on the requirements and interests, a set of query statements is formed and executed. The result set may further be manipulated to get the report content data for a bar chart, pie chart, line chart, etc.

Output 30 ranks the various important reports that are being analyzed and provides a report name, a rank value, etc. Output 40 lists the important reports based upon a comparison of measure values of each report with thresholds. It is these important reports that are judged to be most interesting and most relevant to an analyst who is trying to identify/solve a particular issue. Output 50 is a list of reports judged to be not important. Output 60 is the evidence for a particular analysis of various reports and includes the conclusions from the analysis indicating that certain reports are important and others are unimportant. This evidence includes information such as the ratio of two total distribution sample counts, the Kullback-Leibler divergence between two distributions, the number of bins which have a zero count for baseline data and a non-zero count for current report data, and the corresponding threshold values. The various outputs may be output onto printed paper, sent via e-mail or other electronic transmission, output to a computer screen, etc. In addition, the report ranking output 30 and evidence output 60 may be stored 32 and 62 back into the report database 10 for future reference.

Flow Diagram

Figures 2, 3:
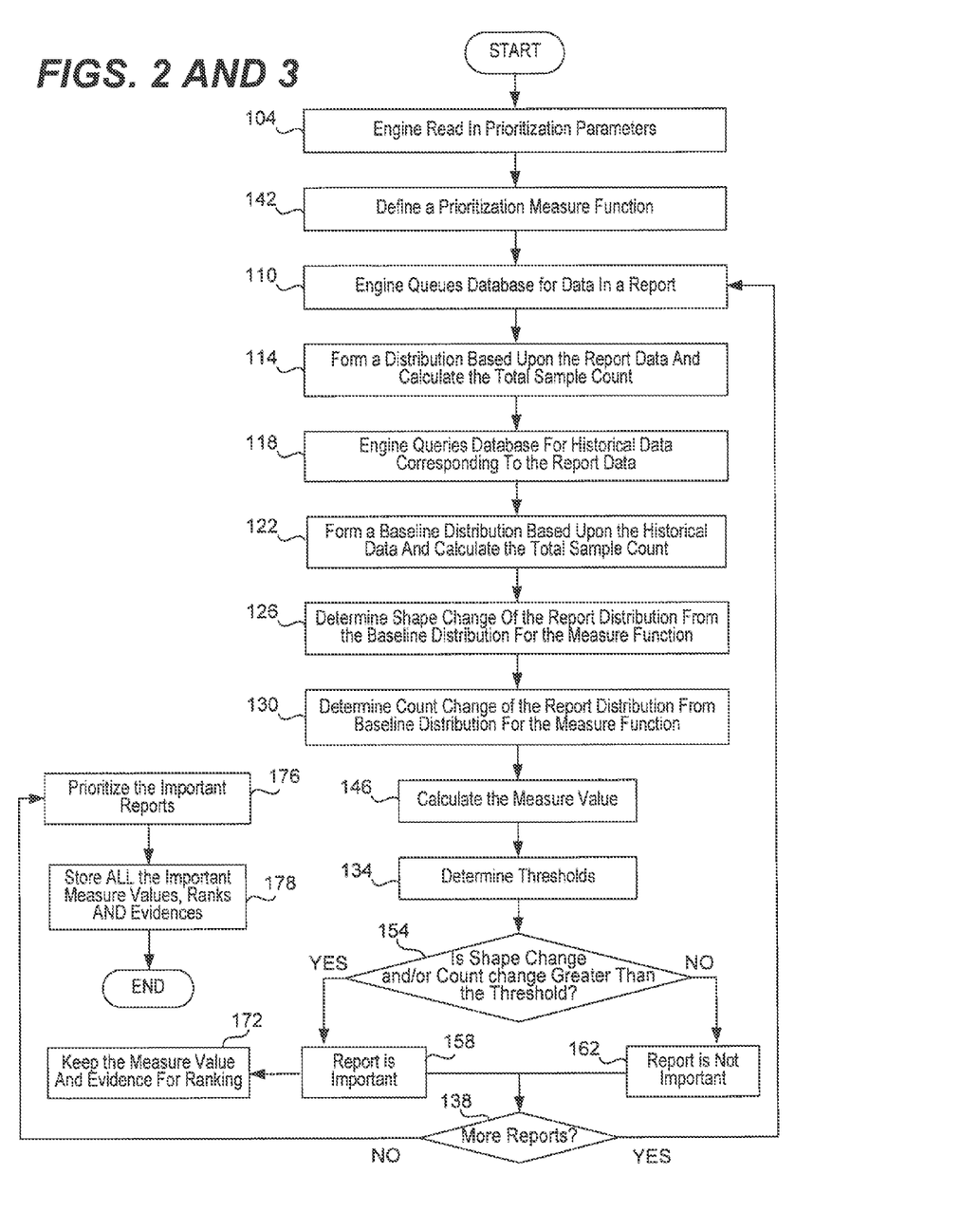
FIGS. 2 and 3 are a flow diagram describing one implementation of the invention.

FIGS. 2 and 3 show a flow diagram describing one implementation of the invention. The list of steps is preferably executed by the prioritization engine 20 shown in FIG. 1. In general, the prioritization engine is used to determine quantitatively how far part is two distributions or two histograms. By inputting the current report content data and the corresponding report baseline data, the engine can determine if the current content is quite different from the baseline content. If so, then the report is noteworthy. By utilizing the various mathematical techniques described below, the engine may process a very large number of reports as well as reports with large volumes of data in a short amount of time in order to provide accurate priority information regarding which reports are noteworthy.

One particular embodiment of the invention, the following parameters may be set (or read in) before execution of the prioritization engine in step 104.

BCZPercent=0.14; The engine also takes into account the number of baseline bins having a value zero and how many number of bins are in a report to determine whether the report is important or not. More precisely, if (number of bins with baseline count=0 and current report count>0)>(total number of bins)×(BCZPercent), then the report is important. This is to practically handle the singularity of $f_{1i}/f_{2i}$, that is $f_{2i}=0$ and $f_{1i}>0$, when calculating the Kullback-Leibler divergence. (When the situation occurs, the engine ignores this bin's contribution to K-L divergence which is used to determine distribution shape change. On the other hand, at the same time it also assigns a predefined large number=100000000.00 for $f_{1i}/f_{2i}$ in order to get a practically useful "K-L divergence value" which is used to calculate the measure value for report priority ranking. The technique may count the number of singularities while calculating a shape change value.)

falsePos=0.01; falsePos=$\alpha$ is the false positive probability saying that a distribution is $f_1$ (i.e., not $f_2$).

falseNeg=0.001; falseNeg=$\beta$ is the false negative probability saying that the distribution is not $f_1$ (i.e., is $f_2$).

ONDPercent=0.59; m=(ONDPercent)×(total number of bins) is the expected sample size given the distribution $f_1$ is correct. Assume it is also the expected sample size given the distribution $f_2$ is correct. $Thr_e=(\beta \ln(\beta/(1-\alpha))+(1-\beta)\ln((1-\beta)/\alpha)+\alpha \ln(\alpha/(1-\beta))+(1-\alpha)\ln((1-\alpha)/\beta))/(2.0 \text{ m})$ is the threshold to tell if a report distribution shape changes greatly.

StandSampleNum=3000; s=StandSampleNum is the standard sample number per bin for calculating volume ratio threshold, which tells if a report volume changes greatly.

SampleRatioPow=0.1; r=SampleRatioPow is a positive real number and is used to calculate volume ratio threshold, which tells if a report volume changes greatly. For example, if b=average sample count per bin of the baseline distribution data and $Thr_v=1.0+(s/b)^r$, then $Thr_v=2.0$ when b=3000.

BalanceFactor=0.5; p=BalanceFactor is a positive real number and is used to balance the contributions of distribution shape and distribution volume changes. For example, $M=E_r(R_1)^p$.

RptRatioThr=2.0; After sorting all the report measure values in the descending order, if (measure for report i)/(measure for report i+1)>RptRatioThr, the reports with index=i+1 and after are not important.

RptMaxNum=10; RptMaxNum tells the prioritization engine what is the maximum number of important reports (even if RptRatioThr is not satisfied yet).

In step 142 a measure function is defined as described above. The measure function will be used to determine a measure value for each report in order to rank each report in descending order of importance. The measure function is $M=E_r \cdot R_f^p$. A value of 0.5 works well for the variable p.

Figure 4:
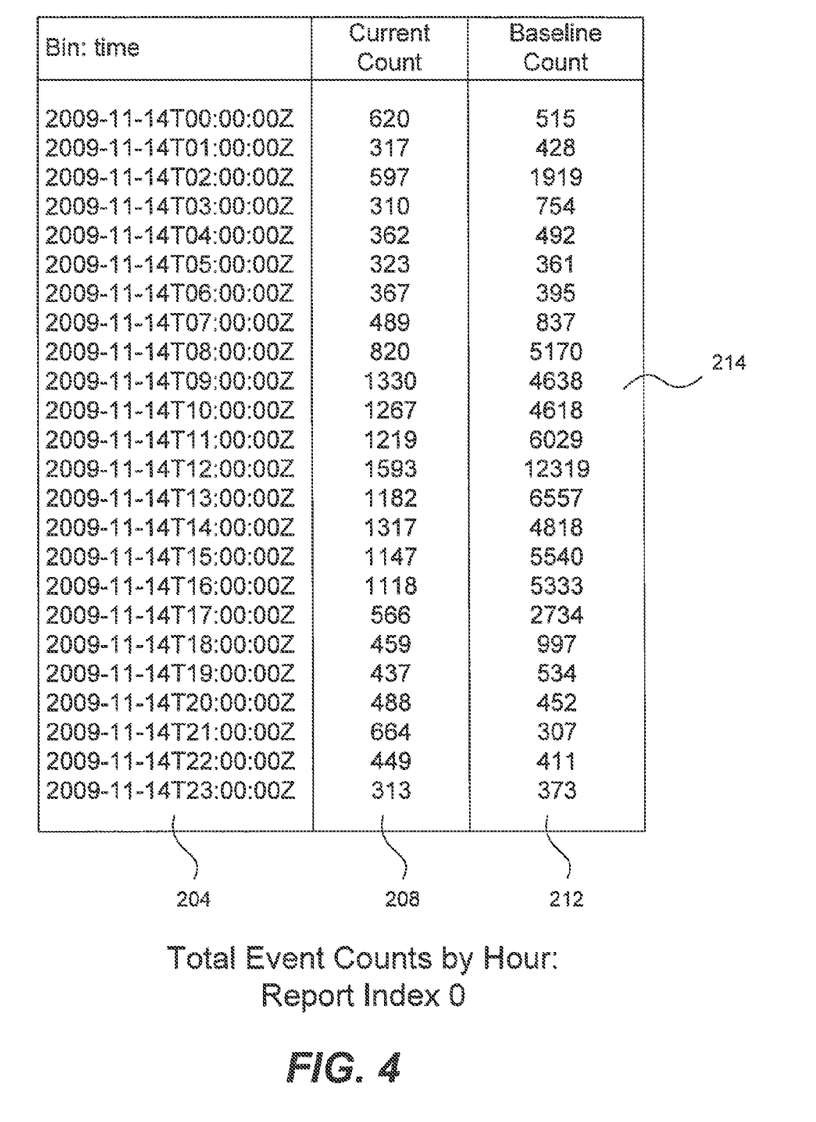
FIG. 4 illustrates a report concerning the total event counts by hour, for a report index 0.

In step 110, a user directs the engine 20 to query the database 10 for the current data of a report of interest. The user may be interested in a single report, a large number of reports for the same issue or phenomenon (that might span different time periods, different locations or different features), or a variety of reports concerning different issues. The current data may come in any of a variety of forms. For example, the query produces the current data 208 for the report "Total Event Counts by Hour" is shown in FIG. 4.

In step 114, the current data retrieved from the database forms a current distribution (representing a current histogram). In other words, the current distribution is formed from all of the data in column 208. The current distribution may be retrieved in a single query from the database, or, if the data is retrieved individually, step 114 is used to place all the data into the current distribution.

In step 118 the engine queries the database for a second time for this report to obtain historical data that are going to be used for baseline calculation. The baseline data may be the data from an earlier time at the same weekly hour. Baseline data may be an average of previous values, an expectation based upon previous values, a weighted value based upon decay on previous values, or others. Although the baseline data may be calculated in many sophisticated ways based upon historical data, the present invention is focus on efficiently using the retrieved historical data for baseline calculations. For example, if today is Monday and we have a report of attack counts with a specific user name per hour, the baseline can be simply defined as the average attack count for that one user at that same hour for the past four Mondays. Thus, an important report means that the report content has changed a lot when comparing with the same hours of the last four Mondays.

In step 122, the historical data retrieved from the database forms a baseline distribution (representing a baseline histogram). In other words, the baseline distribution is formed from all of the data in column 212. The baseline distribution may be retrieved in a single query from the database, or, if the data is retrieved individually, step 122 is used to place all the data into the baseline distribution.

In step 126 the engine analyzes the shape change of the distributions for the report, favoring the first distribution against the second. As described above, the Kullback-Leibler divergence is used to measure the shape change (i.e., the variation between) the two distributions and results in a value $E_r$. For example, the data in column 208 is compared against the data in column 212 for the illustrated report.

In step 130 the engine analyzes the volume change of the distributions for the report, favoring the first distribution against the second. The volume for each distribution is essentially the area under the curve for each distribution. The volume of a distribution also means the total sample count of a distribution. As described above, the $L^1$ norm is used to calculate the distribution volume. In one embodiment, the volume change is measured by the ratio of one volume to the other and results in a value $R_1$.

In step 146 a measure value is calculated for each of the reports that have been analyzed above using the defined measure function and using the previously determined shape change value and volume change value for each report.

In step number 134 the prioritization engine uses the Kullback equation described above to dynamically determine the cutoff threshold for the Kullback-Leibler divergence for this particular report, resulting in a value $Thr_e$. This step also determines a volume ratio threshold to be used by the $L^1$ norm ratio for this particular report, resulting in a value $Thr_v$. Both of these threshold values are unique to the current report being analyzed, hence, they are calculated report by report. In one embodiment, the thresholds are used in determining report importance below in step number 154. As analyzed above, $Thr_e=0.406$ for the total bin number=24 and $Thr_v=2.0$ for the average baseline sample count per bin=3000.

Step 154 determines whether the previously calculated shape change or volume change for each report is greater than a threshold. It is also possible to use the measure value for each report and determine if this measure value is greater than the measure threshold defined above. If any of these three values are greater than their corresponding threshold then this indicates that this report is important and should be looked at by a user. First, the shape change previously determined in step 126 is compared against the cutoff threshold for the Kullback-Leibler divergence determined in step 134. If the shape change value is greater than this cutoff threshold this indicates that the contents of current report have deviated significantly from the baseline content and that the report is significant. In addition, the volume change previously determined in step 130 is compared against the volume ratio threshold determined in step 134. If the volume change value is greater than this volume ratio threshold this indicates that the contents of current report have deviated significantly from the baseline content and that the report is significant. The measure value for each report determined in step number 146 is also compared against the measure threshold defined in step number 134. A measure value greater than the threshold indicates that the report is significant. Any of these three values being greater than their corresponding threshold will flag the report as being important. If a predefined number of reports for reading are required, the parameters of RptRatioThr and RptMaxNum can be applied.

In step 158 each report being flagged as important is output to the user for analysis. The output may include: the name of the report, the priority rank, the report content data, the number of bins with a baseline count equal to zero and a current report count not equal to zero; the K-L divergence (i.e., the Relative Entropy) for measuring the distribution shape change and the ratio of the distribution counts for measuring total event count change between the current report data and baseline data.

Important reports may be flagged and output in any suitable manner such as by printing the reports, displaying reports on a computer screen, sending an e-mail message or other alert to a user, storing the reports and all of the generated output data back into the report database 10, etc. In one embodiment, when a user signs in and searches or browses the reports, the system shows a list of important report names with ranking scores based upon the user selected timestamp. (It can be the current time by default.) When a report link is clicked, the detailed report content together with ranking evidence is shown on the web page. Bear in mind that this required information is queried from the report database during run time. The prioritization engine runs periodically and all these output data are stored in the report database accordingly in step 178.

In step 162 each report being flagged as not being important (or simply not being flagged) may also be output or otherwise marked. Unimportant reports may also be flagged and output in any suitable manner as described above. In one embodiment, unimportant reports may simply be ignored by the prioritization engine.

At this point, all data for the instant report has been retrieved and analyzed, and step 138 checks whether there are more reports should be analyzed. If so, then control returns to step 110 to process the next report with content data in the database. If not, then control moves to step 176.

The reports are then sorted and ranked in step 176 in descending order of measure value, indicating their relative importance. In step 178 the ranked reports along with their measure values and ranks may be output at this time (or may be kept internal to the prioritization engine).

Example Inputs and Outputs

As explained above, the prioritization engine 20 queries the report database 10 for current report data and baseline report data for a particular type of report. FIG. 4 illustrates a report concerning the total event counts by hour, for a report index 0. An event count may be, for example, an indication of malware detected within a computer, within a computer network, within an enterprise, within a particular geographic region, or worldwide. Column 204 contains the x-axis data, namely time, in units of one hour over a 24-hour period. Column 208 provides the y-axis current report data for a current histogram indicating how many malware events occur within a particular hour. Column 212 provides the y-axis baseline report data for a baseline histogram indicating how many malware events occurred within that particular hour in the past. This baseline historical data may be from a given day sometime in the past, may be an average over certain prior time period or maybe generated in other manners. Thus, a current histogram may be derived from columns 204 and 208, and a baseline histogram may be derived from columns 204 and 212. The report data shown at row 214 indicates that between 9 a.m. and 10 a.m. there were 1330 malware events occurring, and that historically, there have been 4638 malware events occurring during that same one hour time period.

Figure 5:
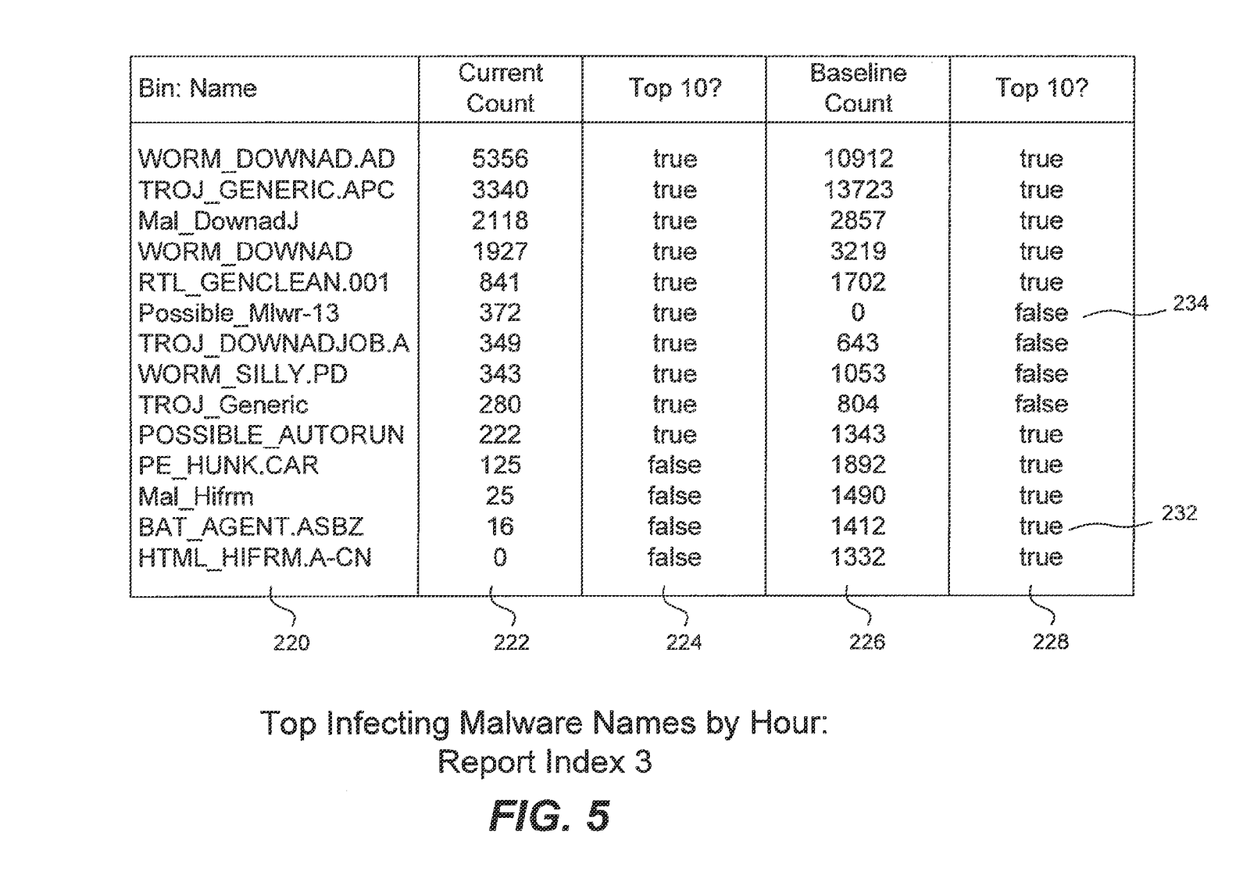
FIG. 5 illustrates a report concerning the top infecting malware names by hour, for report index 3.

FIG. 5 illustrates a report concerning the top infecting malware names by hour, for report index 3. The report indicates which malware infects the most computers within a particular network (or region or worldwide) within a given hour. Column 220 contains the x-axis data, namely the names of malware. Column 222 provides the y-axis current report data for a current histogram indicating how many times a particular malware infects a computer within a particular hour. Column 226 provides the y-axis baseline report data for a baseline histogram indicating how many times that particular malware infects a computer within that particular hour in the past. This baseline historical data may be from a given day some time in the past, may be an average over certain prior time period or maybe generated in other manners. Thus, a current histogram may be derived from columns 220 and 222, and a baseline histogram may be derived from columns 220 and 226. Column 224 indicates whether that particular malware name is in the top 10 of infecting malware for the current data. Column 228 indicates whether that particular malware name is in the top 10 of infecting malware for the baseline data.

The report data shown at row 232 indicates that for a given hour the malware "BAT_AGENT.ASBZ" infected 16 computers whereas historically, that same malware has infected 1412 computers is a baseline value during that same one hour time period. In this report example only a single baseline count has a value of zero, although it is possible that other malware baseline counts would have a value of zero as well. Row 234 shows a value of zero for the baseline count (not in the top 10), while the current report count is in the top 10. Remember that a baseline (or current) value of zero means that there is no infected computer by this malware. The baseline (or current) value is actually 0 for this bin. Notice that baseline values of zero and current values of non-zero are not included in the calculation for K-L divergence for determining distribution shape change as they would cause the divergence to reach infinity. Instead, this kind of bin is counted and if it is greater than a report-related threshold, the report is important.

Other types of reports (not shown) may also have raw data been stored in the database and retrieved by the prioritization engine for analysis. For example, a report concerning the top infected source host names by hour (a report index 1) would present a list of host names (x-axis data), a current count of how many times that host is infected in a given hour (current data) and a historical count of how many times that host has been infected in that same given hour (baseline data). A report concerning the top infected user identifiers by hour (a report index 2) would present a list of user identifiers, e.g., "administrator," (x-axis data), a current count of how many times that user identifier experiences a malware attack in a given hour (current data) and a historical count of how many times that user identifier has been infected in that same given hour (baseline data).

A report concerning the top infected file names by hour (a report index 4) would present a list of file names, e.g., "autorun.inf," (x-axis data), a current count of how many times that file name is infected in a given hour (current data) and a historical count of how many times that file name has been infected in that same given hour (baseline data). A report concerning the top infection sources by hour (a report index 5) would present a list of source names, e.g., "Administrator," (x-axis data), a current count of how many times that source infects the others in a given hour (current data) and a historical count of how many times that source has infected the others in that same given hour (baseline data).

A report concerning the top infected destinations by hour (a report index 6) would present a list of destinations, e.g., "MAILSERVER," (x-axis data), a current count of how many times that destination is infected in a given hour (current data) and a historical count of how many times that destination has been infected in that same given hour (baseline data).

A report concerning the top uncleanable files by hour (a report index 7) would present a list of file names that are uncleanable that have been infected, e.g., "autorun.inf," (x-axis data), a current count of how many times that file has been infected in a given hour (current data) and a historical count of how many times that file has been infected in that same given hour (baseline data).

Figure 6:
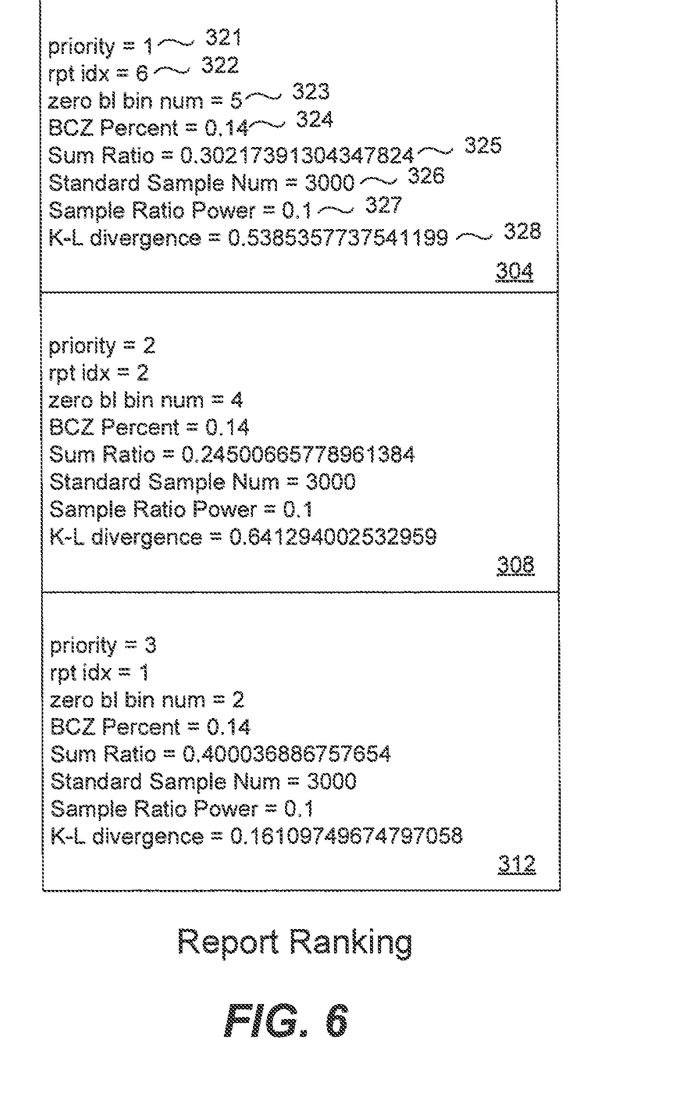
FIG. 6 is an example of a report ranking output.

As explained above, the prioritization engine 20 also outputs a report ranking 30, an indication of the importance ranks of the important reports, and the corresponding evidence 60. FIG. 6 is an example of a report ranking output. This ranking may be based, for example, on the eight different reports that are described immediately above (report indices 0-7). In this example only three reports are qualified and listed, although it is contemplated that a complete report ranking would list all of the reports. The top three prioritized reports have indices 6, 2 and 1, and are shown in the figure at 304, 308 and 312.

For each ranked report, a series of data is presented. With reference to report 304, the first item is its priority 321. The second item is an identification of the report, namely the report index 322. The next item is the number of bins that have zero counts for baseline data and non-zero counts for current data 323. When baseline count of a bin is zero and current count of the same bin is not zero, the K-L divergence is mathematically infinity. This is a strong indication that the current distribution diverges from its baseline. The prioritization engine generates a report-dependent threshold value= (total number of bins)×(BCZ Percent) 324. This means that when this kind of bin count number is greater than the BCZ threshold, the distribution shape changes significantly and thus the report is important.

The Sum Ratio 325 is the same as the volume ratio value calculated above. The Sum Ratio threshold=1.0+[(Standard Sample Number)/(average baseline sample count per bin)]$^{Sample\ Ratio\ Power}$ 326 and 327 is the same as what was defined above. The K-L divergence value 328 is a measure of the shape change between the two distributions and has been explained above.

In this report ranking example the reports have been ranked using their measure values as explained above. The reports may also be further analyzed in terms of importance as explained in step number 154 above. The important reports may be further output, highlighted or indicated in a particular fashion, and the unimportant reports may also be output in a particular fashion. For example, while it appears that the volume ratio for each of the reports is not greater than the volume ratio threshold, it appears that the K-L divergence value for the first two reports 304 and 308 are both greater than the suggested cutoff threshold of 0.3-0.5 as discussed above. In this case, the first two reports would be flagged as being important while the third report would be flagged as being unimportant.

However, the third report may also be flagged as important if the number of baseline bins having a value of zero is taken into account. In this example, the third report 312 has two baseline bins having a value of zero. This means that the current report data corresponding to those two baseline numbers varies dramatically from the baseline (the baseline value is zero). An actual mathematical calculation of the K-L divergence would result in infinity, although these zero values may be ignored in order to produce an actual numerical result for the K-L divergence. In any case, because two of the baseline values are zero, this third report may also be deemed important because theoretically its K-L divergence value would be quite high. To practically handle the singularity, if (number of bins with baseline count=0 and current report count>0)>(total number of bins)×(BCZ Percent) 324, then the report is important. Since 2.0>14×0.14=1.96, the third report is also classified as important. Notice that the first two reports are also important by using the same criterion.

Computer System Embodiment

Figure 7A:
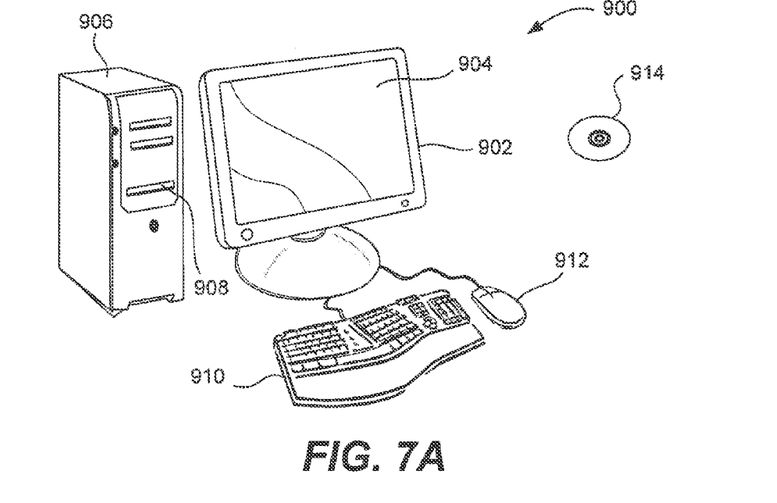
FIGS. 7A and 7B illustrate a computer system suitable for implementing embodiments of the present invention.
Figure 7B:
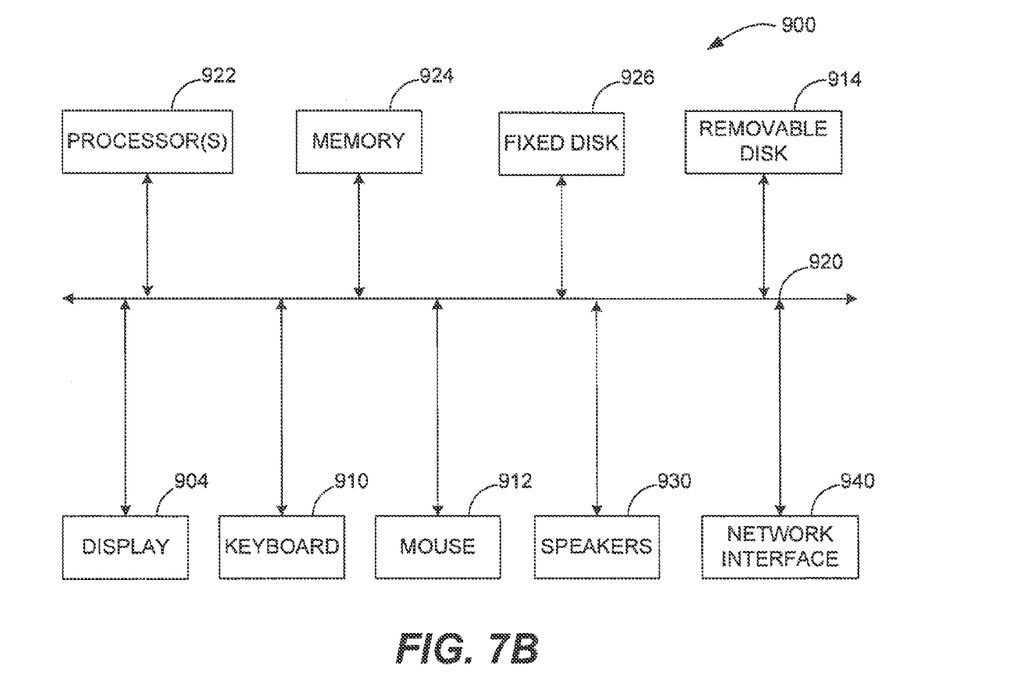

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of ranking a report, said method comprising:
receiving a report including a current distribution of first numerical data, said current distribution being distributed across a plurality of bins;
receiving a baseline distribution of second numerical data, said baseline distribution being historical data relative to said current distribution and also being distributed across said plurality of bins;
calculating a shape change value between said current distribution and said baseline distribution using a computer;
calculating a volume change value between said current distribution and said baseline distribution using said computer;
calculating a measure value by combining at least said shape change value and said volume change value using said computer; and
outputting a rank of said report based upon said calculated measure value.

2. A method as recited in claim 1 further comprising:
using Kullback-Leibler divergence to calculate said shape change value.

3. A method as recited in claim 1 further comprising:
using $L^1$ norm ratio to calculate said volume change value.

4. A method as recited in claim 1 further comprising:
outputting that said report is important when it is determined that said shape change value is greater than a cutoff threshold, when it is determined that said volume change value is greater than a volume ratio threshold, or when it is determined that said measure value is greater than a measure threshold.

5. A method as recited in claim 1 further comprising:
outputting that said report is important when it is determined that a number of bin values in said baseline distribution are zero while the same bin values in said current distribution are non-zero.

6. A method as recited in claim 1 further comprising:
calculating said measure value using the formula (shape change value*(volume change value)$^p$), where p is a positive real number.

7. A method as recited in claim 1 further comprising:
determining a cutoff threshold for said shape change value, a zero baseline bin threshold for a singularity count value, and a volume ratio threshold for said volume change value that are all dependent upon said baseline distribution.

8. The method as recited in claim 1 wherein said second numerical data is of the same type as said first numerical data.

9. A method as recited in claim 1 wherein said first and second numerical data is a count of malware events.

10. The method as recited in claim 1 wherein said first and second numerical data is a count of malware events.

11. The method as recited in claim 1 wherein said first and second numerical data is a count of malware events.

12. The method as recited in claim 1 wherein said shape change value is the variation in shape between said current distribution and said baseline distribution represented as a current histogram and a baseline histogram, respectively, and wherein said volume change value is the variation in volume between said current distribution and said baseline distribution represented as said current histogram and said baseline histogram.

13. A method of ranking a plurality of reports, said method comprising:

receiving a plurality of reports, each report including a current distribution of numerical data, wherein each current distribution is distributed across a plurality of bins;

receiving a plurality of baseline distributions of numerical data, each baseline distribution being historical data relative to a single one of said current distributions and also being distributed across said bins corresponding to said single one of said current distributions;

calculating a shape change value between each of said current distributions and its corresponding baseline distribution using a computer;

calculating a volume change value between each of said current distributions and its corresponding baseline distribution using said computer;

calculating a measure value for each report by combining at least said shape change value and said volume change value of each report using said computer; and ranking each of said reports using said calculated measure values; and outputting said ranking of said reports.

14. A method as recited in claim 13 further comprising:
using Kullback-Leibler divergence to calculate said shape change value.

15. A method as recited in claim 13 further comprising:
using $L^1$ norm ratio to calculate said volume change value.

16. A method as recited in claim 13 further comprising:
outputting that one of said reports is important when it is determined that said shape change value is greater than a cutoff threshold for said one report, when it is determined that said volume change value is greater than a volume ratio threshold for said one report, or when it is determined that said measure value is greater than a measure threshold for said one report.

17. A method as recited in claim 13 further comprising:
outputting that one of said reports is important when it is determined that a number of bin values in the baseline distribution for said one report are zero while the same bin values in said the corresponding current distribution are non-zero.

18. A method as recited in claim 13 further comprising:
calculating said measure value using the formula (shape change value*(volume change value)$^p$), where p is a positive real number.

19. A method as recited in claim 13 further comprising:
determining a cutoff threshold for said shape change value, a zero baseline bin threshold for a singularity count value, and a volume ratio threshold for said volume change value that are all dependent upon said baseline distribution.

20. The method as recited in claim 13 wherein said second numerical data is of the same type as said first numerical data.

21. The method as recited in claim 13 wherein said shape change value is the variation in shape between said current distribution and said baseline distribution represented as a current histogram and a baseline histogram, respectively, and wherein said volume change value is the variation in volume between said current distribution and said baseline distribution represented as said current histogram and said baseline histogram.

22. A method of ranking a report, said method comprising:

receiving a report including a current distribution of first numerical data, said current distribution being distributed across a plurality of bins;

receiving a baseline distribution of second numerical data of the same type as said first numerical data, said baseline distribution being historical data relative to said current distribution and also being distributed across said plurality of bins;

calculating a shape change value between said current distribution and said baseline distribution using a computer;

calculating a volume change value between said current distribution and said baseline distribution using said computer; and outputting that said report is important when it is determined that said shape change value is greater than a cutoff threshold or when it is determined that said volume change value is greater than a volume ratio threshold.

23. A method as recited in claim 22 further comprising:
calculating a measure value by combining at least said shape change value and said volume change value; and
outputting a rank of said report based upon said calculated measure value.

24. A method as recited in claim 23 further comprising:
outputting that said report is important when it is determined that said measure value is greater than a measure threshold.

25. A method as recited in claim 22 further comprising:
outputting that said report is important when it is determined that a number of bin values in said baseline distribution are zero while the same bin values in said current distribution are non-zero.

26. A method as recited in claim 22 further comprising:
calculating said measure value using the formula (shape change value*(volume change value)$^p$), where p is a positive real number.

27. A method as recited in claim 22 further comprising:
determining a cutoff threshold for said shape change value, a zero baseline bin threshold for said singularity count value and a volume ratio threshold for said volume change value that are all dependent upon said baseline distribution.

28. The method as recited in claim 22 wherein said shape change value is the variation in shape between said current distribution and said baseline distribution represented as a current histogram and a baseline histogram, respectively, and wherein said volume change value is the variation in volume between said current distribution and said baseline distribution represented as said current histogram and said baseline histogram.

* * * * *